July 26, 1966  M. P. ALBERTSON ET AL  3,262,191

METHOD OF FORMING WHEEL DISKS

Filed Dec. 28, 1962  3 Sheets-Sheet 1

INVENTORS.
MEREDITH P. ALBERTSON
CHARLES H. HAAS
DONALD N. OWENS
HENRY F. WINNAI

BY John B. Sowell
ATTORNEY

July 26, 1966

M. P. ALBERTSON ET AL 3,262,191

METHOD OF FORMING WHEEL DISKS

Filed Dec. 28, 1962

INVENTORS.
MEREDITH P. ALBERTSON
CHARLES H. HAAS
DONALD N. OWENS
HENRY F. WINNAI

BY

John B. Sowell
ATTORNEY

July 26, 1966     M. P. ALBERTSON ET AL     3,262,191
METHOD OF FORMING WHEEL DISKS
Filed Dec. 28, 1962     3 Sheets-Sheet 3

INVENTORS.
MEREDITH P. ALBERTSON
CHARLES H. HAAS
DONALD N. OWENS
BY HENRY F. WINNAI

John B. Sowell
ATTORNEY

United States Patent Office 3,262,191
Patented July 26, 1966

3,262,191
METHOD OF FORMING WHEEL DISKS
Meredith P. Albertson, Grosse Pointe Farms, and Donald N. Owens, Clawson, Mich., and Charles H. Haas, Philadelphia, and Henry F. Winnai, Huntingdon Valley, Pa., assignors to The Budd Company, Philadelphia, Pa., a corporation of Pennsylvania
Filed Dec. 28, 1962, Ser. No. 248,023
9 Claims. (Cl. 29—159.01)

This invention relates to axially formed tapered wheel disks and more particularly to a novel method of manufacturing axially formed tapered wheel disks employing a single forming die.

Disk wheels for passenger automobiles are usually formed by stamping a flat metal blank between mating male and female dies. These wheel disks maintain a substantially uniform blank thickness for stamping dies are not capable of both forming the disk and reducing the metal thickness to a tapered shape.

Disk wheels for commercial vehicles, such as buses, are presently produced by two or more metal forming steps. At least one step is required to reduce a blank of constant thickness to a tapered thickness shape, and at least one other step is required to axially form the disk to its finished contour shape. The two largest manufacturers of commercial disk wheels in the United States presently reduce the blank to a tapered thickness by employing some type of metal rolling or metal spinning machine. This operation produces what is known as a preformed blank. In a second or subsequent operation the preformed blank is shaped to its final form employing sets of male and female stamping dies. This latter shape is called the wheel disk or final form.

A major problem in the manufacture of wheel disks is to reduce the amount of waste in making a wheel disk from flat steel sheet or plate and further to reduce the number of physical steps or operations employed in forming a wheel disk into an axially and radially tapered shape.

Heretofore, all tapered section wheel disks involved at least two seperate and distinct metal forming operations employing at least two separate and distinct sets of forming dies.

Therefore, it is a primary object of the present invention to provide a method for forming wheel disks having constant thickness annular portions, tapered thickness outward and axial portions and substantially reduced thickness axial portions from a blank of uniform thickness with a single forming die.

It is another object of the present invention to provide a method of forming a combination wheel disk and rim section having varying thickness cross section from a single blank having uniform thickness.

It is another object of the present invention to provide a method of simultaneously preforming and final forming flat blank material into tapered thickness axial shaped wheel disks and rim sections in a single continuous machine forming operation employing a single forming mandrel.

It is a further object of the present invention to provide a new and improved method of forming reverse curvature shapes and axially formed shapes of a wheel disk while simultaneously reducing in thickness a metal blank by power roll forming.

In accordance with the present invention, the method is accomplished by clamping a constant thickness radial plane annular disk to a male forming mandrel having at least one substantially axially shaped surface and a reverse curvature shaped surface thereon, power roll forming said radial plane annular disk against said mandrel by simultaneously engaging said disk with a plurality of circumferentially and radially disposed forming rolls having their working faces axially displaced one from the other so that the axially leading roll of said plurality of rolls substantially bends said radial plane annular disk out of said radial plane to permit the lagging roll to extrusion form and roll form said disk over said axial shape and said reverse curvature shape in a single simultaneous pass operation of said plurality of said power rolls over said mandrel.

Other features and objects of the invention will be found throughout the more detailed description of the method and its manner of operation the description of which is supplemented with the accompanying drawings wherein:

FIG. 1 is a plan view of a horizontal bed shear spinning machine having a mandrel and tracer controlled power rolls capable of performing the present method.

FIG. 3 is an enlarged plan view in section of the mandrel of FIG. 1 showing the wheel disk formed thereon and having the original blank superimposed thereon.

Figure 4:
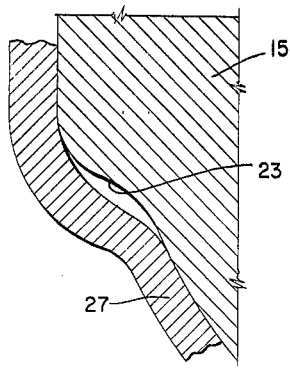
FIG. 4 is a partial section in a plan view of the mandrel of FIGS. 1 to 3 at the point of reverse curvature and showing a preformed blank thereon.

The shear spinning machine depicted in FIG. 1 is a commercially available machine similar to those shown in United States Patents Nos. 2,960,951 and 2,975,743 employed for shear spinning.

In order to clearly define the physical operations employed in the present method the following terms and their meaning will be employed in this specification:

Shear spinning and/or power spinning shall mean sine law spinning wherein the axial displacement of the metal blank maintains its radial distance from the center of rotation of the mandrel. It has been established by those skilled in the spinning art that shear spinning by the sine law is to be obeyed rather closely with some slight deviations allowed which theoretically limits one pass action to cone angles of about 30 degrees. This limitation is imposed because the blank is being formed at its inner annular surface and the portion of the annular blank not yet formed extends radially outward as an upstanding radial plane flange which is difficult or impossible to shrink or expand with presently employed shear spinning methods.

Spinning for purposes of this specification shall mean roll spinning wherein a blank is bent or formed from one annular plane to another.

Conventional spinning for purposes of this specification shall mean spinning without noticeably changing the blank thickness.

Power spinning for purposes of this specification shall mean spinning with powered rollers according to the sine law.

Contour spinning for purposes of this specification shall mean power spinning employing tracer controls on the power rolls.

Roll forming for purposes of this specification shall mean the forming of metal blanks by compressing the metal under the rolls to reduce the thickness of the blank.

Tube forming, tube spinning and tube extrusion shall mean roll forming of cylindrical shapes or tubular shapes to reduce the cylindrical wall thickness and to elongate the cylinder or tubular shape.

The term *power roll forming* as employed hereinafter shall include any and all of the above physical forming concepts and may combine other physical operations.

Wheel disks heretofore were made by preforming a flat blank to obtain a tapered blank and subsequently in a separate step final forming the wheel disk shape between mating male and female dies. Preformed shapes have been obtained by contour spinning according to the sine law over a conical-parabolic mandrel on a shear spinning machine similar to that shown in FIG. 1. However, prior to applicants' entry into the field an axially formed tapered section wheel disk had never been made with a single forming mandrel nor had a tapered section axially formed wheel disk been made in a single metal forming operation.

Shear spinning machine 10 is equipped with a power driven head stock 11 for rotating a radial plane annular metal blank 12 to be formed by rolls 13 and 14 over a mandrel 15 having an outer contour shaped to the inner contour of a wheel disk to be formed thereby. A tail stock 16 is axially aligned with head stock 11 and provides means for clamping a blank 12 between the head stock 11 and tail stock 16 to enable the rolls 13 and 14 having power drives 17 and 18 and tracer control 19 to form the blank 12 over the mandrel 15. Tracer control 19 comprises a tracer 20 which follows a metal template 21 having a shape of an outside surface contour of the wheel disk being formed. Each roll is designed to employ its own tracer 20 and template 21.

Figure 2:
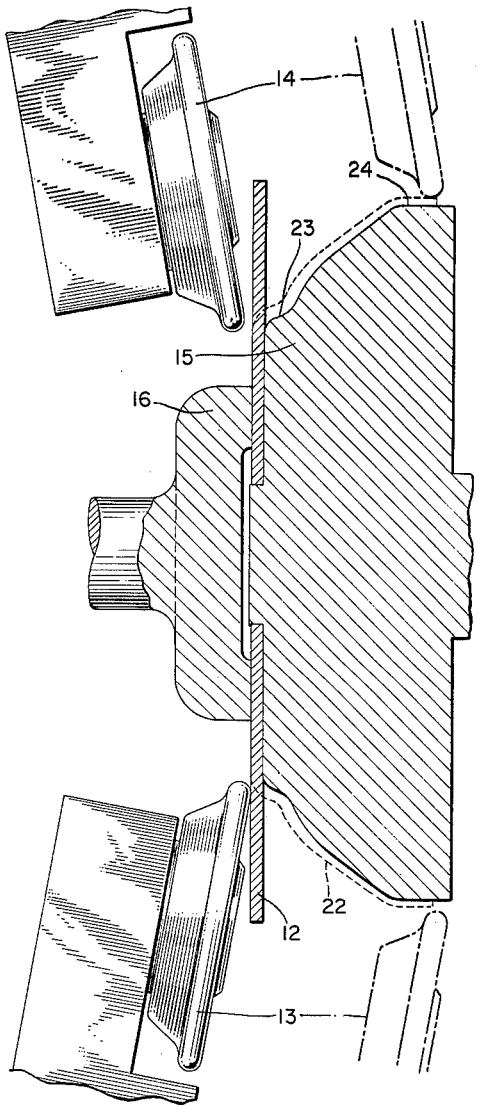
FIG. 2 is an enlarged plan view in partial section of the power rolls and mandrel of FIG. 1.

Roll 13 is shown in FIG. 2 in engagement with blank 12 at the beginning of the forming operation. Roll 14 is axially removed from the blank or trailing the roll 13. At the end of the operation the leading roll 13 is radially removed from the finished wheel disk 22 and roll 14 is trailing roll 13 but in engagement with wheel disk 22. Mandrel 15 departs from mandrels employed for shear spinning and sine law spinning in that it is provided with a reverse curvature portion 23 and an axial portion 24. The departure from sine law spinning is graphically illustrated by the showing in FIG. 3 wherein the original thickness $t1$ of the blank 12 at the reverse curvature portion 23 has been changed in axial thickness from $t1$ to $t2$ and at the axial portion 24 has been changed from its axial thickness of $t1$ to $t3$. Also the blank 12 for the present method is larger in diameter than the wheel disk 22 being formed.

A further illustration of the departure from shear spinning is illustrated at the conical portion of the mandrel extending between points 25 and 26 for the axial thickness of the wheel disk at these points tapers from $t4$ down to $t5$ further illustrating that the axial displacement of the metal blank does not maintain its radial distance from the center of rotation of the mandrel.

Figure 5:
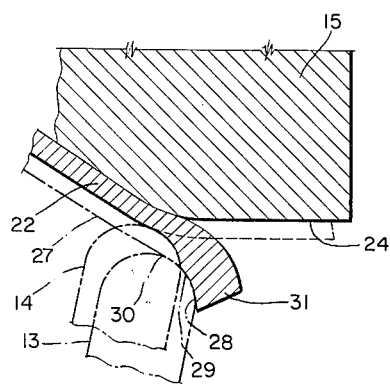
FIG. 5 is a partial section in plan view of the mandrel at the axial surface portion of the mandrel showing the relative displacement of the power rolls.

Throughout the forming process several physical operations are being performed simultaneously. In order to explain the operation of the individual rolls there is shown in FIGS. 3 and 4 an outline of a theoretical preformed disk 27 which would be formed from blank 12 by roll 13 if it were acting alone. Roll 13 is tracer controlled to follow the outside contour of preformed disk 27. However, as will be explained hereinafter such a shape is not actually formed because rolls 13 and 14 are employed simultaneously. If roll 13 was employed alone the preformed blank would terminate short of the axial portion 24 as shown in FIG. 3 and if roll 14 was employed in a subsequent and independent operation on the preformed disk 27 the disk being formed would probably fail somewhere in the vicinity of point 26. Leading roll 13 is tracer controlled to follow a path which will (1) bend the blank out of its radial plane; (2) will not form the blank 12 to the mandrel 15 at the reverse curvature portion 23; (3) will form the blank to the mandrel and all other points along the mandrel except at the reverse curvature portion 23; and (4) will decrease the actual blank thickness along the entire forming portion of the blank. The action of leading roll 13 can best be called power roll forming for the action is neither shear spinning, contour spinning, nor conventional spinning. The forward face 28 of roll 13 bends the blank 12 out of its axial plane along the length of the wheel disk and is believed to perform in a manner similar to conventional spinning. The forward edge portion 29 of roll 13 traps a portion of the blank in front of the roll and pushes it forward over the mandrel causing the metal to flow like a wave. The bottom 30 of the roll 13 traps a portion of the blank in compression and squeezes it between the roll and the mandrel and is believed to perform similar to roll forming combined with tube extrusion. As leading roll 13 reaches the axial portion 24 of the mandrel 15 the blank is bent down as shown in FIG. 5 and maintained close enough to the mandrel 15 so that the blank is initially preformed by face 28, edge 29 and bottom 30 of roll 13. However, when the leading roll 13 reaches the end of the blank there can be no bending action for there is no upstanding radial plane flange 31 to be acted upon nor is there a portion of the mandrel in axial alignment with roller 13 to facilitate compression forming in the axial direction. However, the action of roll forming combined with tube extrusion continues until roll 13 loses contact with the blank 12. The portion of the blank opposite the reverse curvature portion 23 is shown in FIG. 4 to be reduced in thickness but removed from the mandrel. It is believed that the metal blank at the reverse curvature portion is reduced in thickness due to axial forces of the roll 13 acting in tension on that portion of the blank as well as roll compression.

Figure 6:
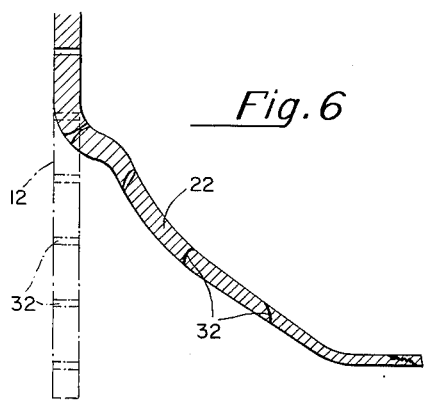
FIG. 6 is a cross section of the wheel disk having a tapered thickness made by the present method over the mandrel shown in FIGS. 1 to 3 and illustrating the surface flow of metal by drilled test holes.

As already explained blank 27 is not actually made during the present process but is used by way of illustration to help explain the independent and combined action of the rolls 13 and 14. Simultaneously with the operation of leading roll 13 the trailing roll 14 is maintaining its relative position to roll 13 and acting upon blank 12 to perform multiple operations in cooperation with leading roll 13. Trailing roll 14 follows behind leading roll 13 and also decreases the actual blank thickness along the entire formed portion of the disk. Since the blank 12 is initially bent by roller 13 there is no conventional spinning action performed by roll 14. However, as shown in FIG. 4 it was discovered that the blank 27 does not close on the mandrel 15 at the reverse curvature portion 23 due to action of the leading roll 13 and at this point in the forming process roll 14 bends the blank as well as reduces its thickness. As roll 14 traverses the portion of the blank at the reverse curvature portion 23, the blank is further reduced in thickness by an action similar to roll forming combined with the tube extrusion. After roll 14 has passed the re-entry portion 23 it is acting upon a portion of the blank already abutting mandrel 15 and continues to reduce the blank in thickness. Therefore, it is known that roll 14 is pushing metal ahead of the roll in an action that is believed to be roll forming combined with tube extrusion and tension forming. This action has been verified by drilling a series of holes radially displaced along the annular disk. The outer surface portion of the disk 22 has been formed by metal which is axially and radially displaced from the metal at the inner surface of the wheel disk 22. This surface flow of metal as verified by drilled test holes 32 is illustrated in FIG. 6. An additional phenomenon was noted in that the test holes drilled along a radial diameter were displaced circumferentially further illustrating that the surface metal is roller formed in compression. The metal under roll 14 is being roller formed and tube extruded axially and circumferentially in the direction of roller travel relative to the mandrel. A portion of the metal under roll 14 is actually pushed forward so that the bottom of leading roll 13 actually acts upon a portion of the metal acted upon by trailing roll 14 as shown in FIG. 5. When roll 14 reaches the axial portion 24, roll 13 has substantially bent the upstanding radial plane flange 31 over far enough so that the action performed by trailing roll 14 becomes roll forming combined with tubular extrusion. Usually the reduction of metal thickness by tubular extrusion is limited to approximately 30 percent in a single pass. Blanks .375 inch in thickness were consistently reduced to a thickness of .190 inch and .140 inch at the axial portion 24 clearly illustrating that tubular extrusion may be easily performed by the present method for reductions of 50 to 69 percent.

Figure 7:
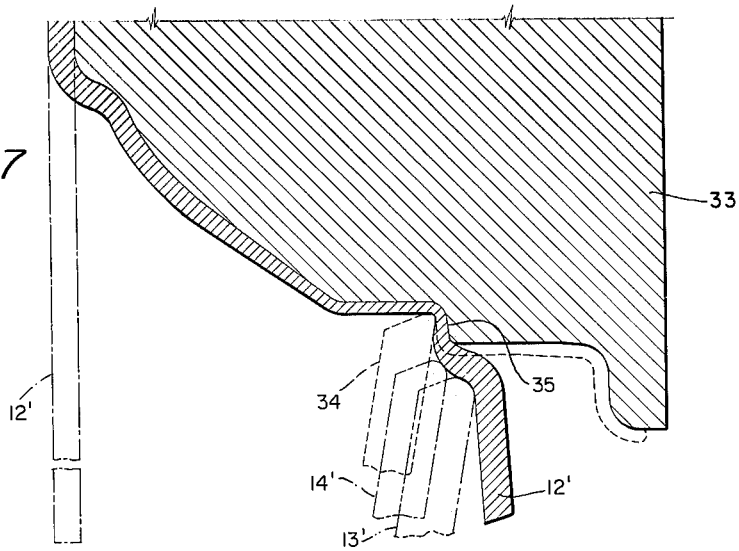
FIG. 7 is a partial section in plan view of a mandrel similar to FIGS. 1 to 3 having a rim forming extension thereon and showing the relative position of a plurality of power rolls employed to perform the present method.
Figure 8:
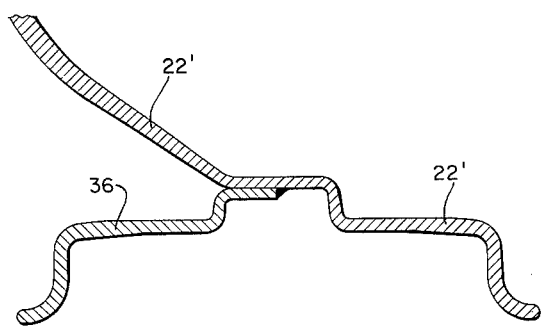
FIG. 8 is a cross section taken through the combination wheel disk and rim section showing a rim section welded thereto to form a disk type wheel assembly.
Figure 9:
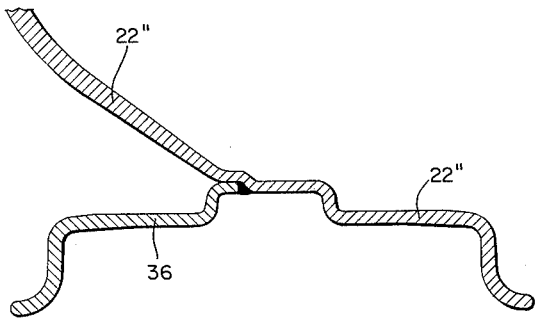
FIG. 9 is a cross section taken through a modified shape combination wheel disk and rim section having a rim section welded thereto to form a disk type wheel assembly.

FIG. 7 shows a mandrel 33 shaped to the inside contour of a combination wheel disk and rim. Having already explained the operation of rolls 13' and 14' like rolls 13 and 14 it would appear obvious that the combination wheel disk and rim sections of FIGS. 7 to 9 may be formed. The working face of roll 34 has a face with a radius of curvature substantially smaller than that of rolls 13' and 14' permitting the reduction of that portion of the blank 12' at radial portions 35 of the mandrel 33 to be further reduced in thickness. Rolls 13', 14' and 34 are shown to have working faces of decreasing radius thus permitting sharper corner finish.

Having already explained the mode of operation of rolls 13 and 14 it is obvious that roll 14' may be made with a working face having a smaller radius of curvature than roll 13' which would enable roll 14' to more closely approximate the desired wheel disk rim section contour 22' without the necessity for roll 34. However, in some instances, the placement of roll 34 at radial portions 35 substantially traps that portion of the blank 12' against the mandrel at the time roll 13' is placing tension at this portion of the blank thus preventing blank 12' at radial portion 35 from lifting off the mandrel and being deformed. A wheel disk and rim section 22' is shown welded to a rim section 36 to form a wheel. Rim section 36 is more shallow than the rim section 22' and constitutes half of a full rim as presently made by roll forming. A modified wheel disk and rim section 22'' may be employed to maintain the presently employed shallow rim shape. Since many wheels are made by attaching wheel disk 22 to full section rims like rim 36 made on separate dies, it is possible to make combination wheel disk and rim sections 22' and 22'' and cut off the rim section 36 thereof. The cut off rim section 36 may be applied to other combination wheel disk and rim sections 22' and 22'' to produce disk wheels.

Experimental disks have been made by blanking circular disk from flat sheet stock. A center hole was provided for the mandrel and the circumferential edges turned to produce true radial plane annular disk. These disks were axially formed by the above described process and welded to various shapes of rims to form wheels. Laboratory and field tests show that the wheel produced by the present method is more accurate in physical dimensions and has greater fatigue strength than the disk wheels made by former methods.

Not only has the wheel disk been improved substantially but less material is required for greater utilization is made of the blank material. It was found that improved accuracy of physical dimensions of the disk permitted the rim and disk to be fitted and welded automatically.

The above-described method basically includes only one metal forming step on the wheel disk or combination wheel disk and rim section employing a single male forming mandrel. This method completely eliminates at least one metal forming step from former methods thus reducing the cost of capital equipment and labor input.

While the preferred embodiment shown and described has been illustrated by way of application to tapered section commercial vehicle wheel disk and rim sections, other applications would appear obvious to those skilled in the art now that the novel method has been explained. It is accordingly desired that the appended claims be given a broad interpretation commensurate with the scope of the invention in the art.

What is claimed is:

1. The method of making axial shaped tapered wheel disk from radial plane annular sheet steel blanks comprising the steps of: cutting a circular blank from a plate or sheet of steel of substantially uniform thickness, cutting a mandrel aperture in the center of said blank, mounting said blank between the headstock and tailstock of a contour spinning machine having a mandrel shaped to the inner surface contour of a wheel disk to be formed, said mandrel having an axial portion with a cone angle of approximately zero degrees, positioning a leading roll having a contact face having a radius of curvature for contacting a surface of said blank and being under control of a template having a contour shaped to the outer surface contour of a theoretical disk to be formed between said mandrel and said leading roll, positioning a trailing roll having a contact face having a radius of curvature smaller than said radius of curvature of said leading roll and being under control of a template having a contour shaped to the actual outer surface contour of a disk to be formed by said rolls, maintaining said trailing roll behind said leading roll under template control, maintaining said trailing roll closer to the axis of rotation of said mandrel than said leading roll under template control, and power roll forming by the action of both said rolls for reducing the thickness and shape of said disk from a radial plane annular blank to an axial shaped tapered disk having an axial portion thereon substantially parallel to the axis of rotation of said mandrel.

2. The method of making tapered section wheel disk from flat blank material comprising the steps of: clamping a flat blank of sheet steel to a male mandrel normal to the axis of rotation, said mandrel having the shape of the inside contour of a wheel disk to be formed, said mandrel having a reverse curvature portion, said mandrel having an axial portion substantially parallel to the axis of rotation of said blank and said mandrel, positioning a plurality of rolls under tracer control, one of said rolls being maintained ahead of the other roll under control of a tracer so that it becomes a leading roll for bending the outward extended flange of said blank out of its normal radially annular plane, another of said rolls being maintained behind said leading roll under tracer control so that it becomes a trailing roll, said trailing roll being maintained closer to the center of the axis of rotation than said leading roll, and power roll forming said blank by said rolls maintained in their relative positions by tracer control so that both rolls reduce the actual thickness of said blank and together form a tapered section wheel disk over said mandrel in a single pass operation of said rolls.

3. The method of making a tapered section wheel disk as claimed in claim 2 wherein each of said rolls includes a working face having a radius of curvature for contacting said blank, said radius of curvature of said leading roll being greater than said radius of curvature of said trailing roll.

4. The method of manufacturing a tapered section wheel disk having an axial attachment rim from a flat annular steel blank comprising the steps of: blanking an annular disk from flat steel sheet, clamping the annular disk blank to a male forming mandrel, said male forming mandrel having the shape of the inside contour of a wheel disk to be formed on said mandrel, positioning a first roll under tracer control to trace a path approximately parallel to the surface of said mandrel, positioning a second roll under tracer control to trace a path having the shape of the outside contour of a tapered section wheel disk having an axial attachment rim, positioning the working face of said first roll ahead of said second roll, and power roll forming said flat blank maintaining said first roll ahead of said second roll so that said first roll engages the annular flange with its working face and bends the root of said flange down over said mandrel to permit said second roll to perform roll forming and forward tubular extrusion on said blank to produce in a single continuous pass of said roll a tapered section wheel disk having an axial rim.

5. The method of manufacturing a tapered section wheel disk as claimed in claim 4 wherein each of said rolls includes a working face having a radius of curvature for contacting said blank, said radius of curvature of said first roll being greater than said radius of curvature of said second roll.

6. The method of manufacturing a combination tapered section wheel disk having an axial attachment rim and wheel rim section from a flat annular steel blank comprising the steps of: clamping an annular disk blank to a male forming mandrel, said male forming mandrel having the shape of the inside contour of the combination wheel disk and wheel rim to be formed on said mandrel, positioning a first roll under tracer control to trace a path approximately parallel to the surface of said mandrel, positioning a second roll under tracer control to trace a path having the shape of the outside contour of a tapered section wheel disk having an axial attachment rim, and wheel rim section, positioning a third roll to actively engage the radial plane portions of the rim section, positioning the working face of said first roll ahead of said second roll, positioning the working face of said second roll ahead of said third roll, and power roll forming said flat blank maintaining said first roll ahead of said second roll so that said first roll engages the annular flange of said blank with its working face and bends the root of said flange down over said mandrel to permit said second roll to perform roll forming and forward tubular extrusion on said bent blank and to permit said third roll to operatively engage said blank behind said second roll to perform roll forming and radial plane tubular extrusion at said radial plane portions of said rim section to produce in a single continuous pass of said rolls a combination tapered section wheel disk having an axial attachment rim and wheel rim section.

7. The method of manufacturing a combination tapered wheel disk as claimed in claim 6 wherein the working faces of said rolls have different radii of curvature, said radius of curvature of said first roll being greater than said radius of curvature of said second roll, and said radius of curvature of said second roll being greater than said radius of curvature of said third roll.

8. The method of making radially and axially extending tapered shapes from flat annular disk comprising the steps of: cutting a blank from flat sheet stock, mounting said blank to a male mandrel normal to the axis of rotation of said mandrel, said mandrel having a radially and axially extending portion and an axial portion approximately parallel to the axis of rotation of said mandrel, positioning a pair of rolls under tracer control having working faces radially and axially removed one from the other, one of said rolls being maintained ahead of the other roll under control of a tracer so that it becomes a leading roll for bending the outward extending flange of said blank out of its normal annular plane, the other of said rolls being maintained behind said leading roll under tracer control so that it becomes a trailing roll, said trailing roll being maintained closer to the center of the axis of rotation than said leading roll, and power roll forming said blank by said rolls maintained in their relative positions by tracer control so that both rolls reduce the actual thickness of said blank and together form a radially and axially extending tapered shape terminating in an axial shape substantially parallel to the axis of rotation of said mandrel in a single continuous pass operation of said rolls.

9. The method of making radially and axially extending tapered shapes as claimed in claim 8 wherein said working faces of said rolls have different radii of curvature, said radius of curvature of said leading roll being greater than said radius of curvature of said trailing roll.

References Cited by the Examiner
UNITED STATES PATENTS

| | | | |
|---|---|---|---|
| 1,413,051 | 4/1922 | Michelin | 301—63 |
| 2,075,294 | 3/1937 | Le Jeune | 29—159.01 |
| 2,133,144 | 10/1938 | Johnson | 29—159.01 |
| 2,368,008 | 1/1945 | Doderer | 72—85 |
| 2,960,951 | 11/1960 | Bierman | 72—83 X |
| 2,975,743 | 3/1961 | Hoffman et al. | 72—83 X |
| 2,983,033 | 5/1961 | Cox | 72—83 X |
| 3,006,692 | 10/1961 | Schubert | 301—63 |
| 3,046,924 | 7/1962 | Kane | 72—85 |
| 3,104,640 | 9/1963 | Sassen et al. | 72—27 |
| 3,143,377 | 8/1964 | Bulgrin et al. | 301—63 |
| 3,205,688 | 9/1965 | Paulton | 72—83 |

JOHN F. CAMPBELL, *Primary Examiner.*

THOMAS H. EAGER, *Examiner.*